Nov. 3, 1936.  H. E. FRENCH  2,059,224
DEVICE FOR MELTING SLEET AND ICE ON WINDSHIELDS
Filed Aug. 5, 1935  2 Sheets-Sheet 2
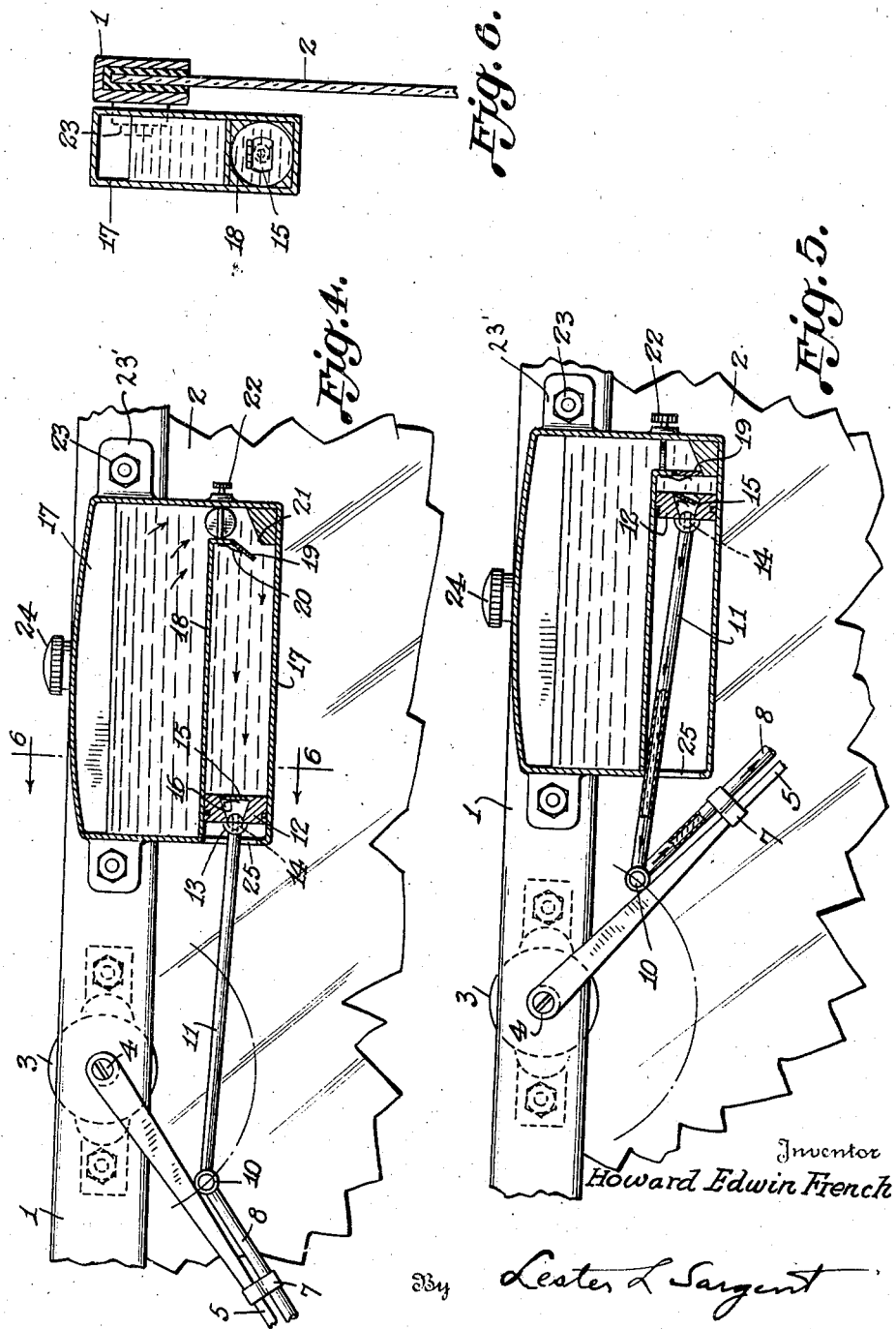
Inventor
Howard Edwin French
By Lester L. Sargent
Attorney Patented Nov. 3, 1936

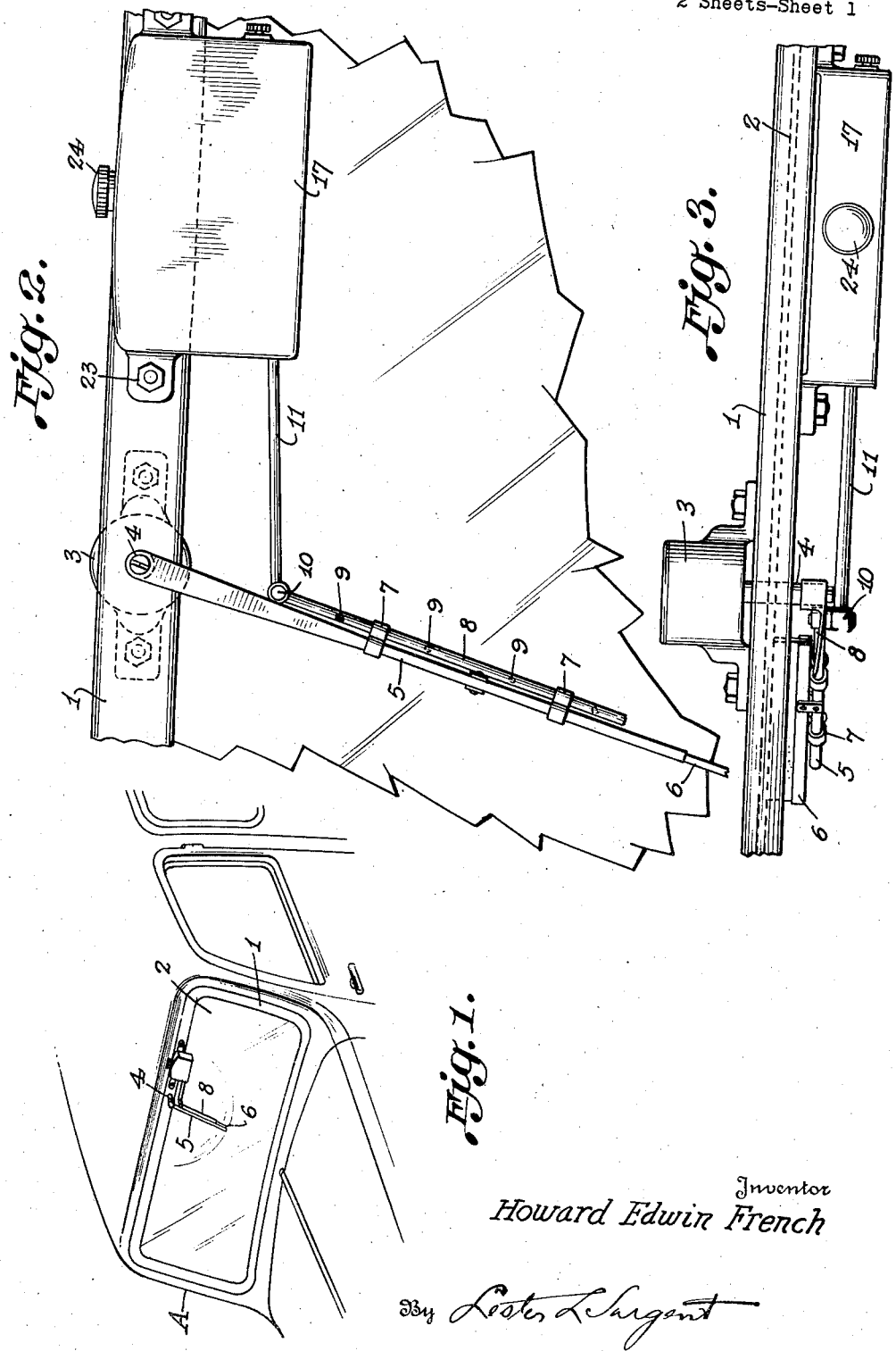

2,059,224

UNITED STATES PATENT OFFICE 2,059,224

DEVICE FOR MELTING SLEET AND ICE ON WINDSHIELDS

Howard Edwin French, Clinton, Conn.

Application August 5, 1935, Serial No. 34,833

1 Claim. (Cl. 20—40.5)

The object of my invention is to provide a novel device for melting sleet and ice on windshields, adapted to be attached to and operated by automatic windshield wipers. It is also an object of my invention to provide a device that will operate on vehicles having the wiper either on the top or on the bottom of the windshield. It is also an object of my invention to provide the novel combination and arrangement of parts disclosed in the accompanying drawings. I attain these and other objects of my invention by the mechanism illustrated in the accompanying drawings, in which—

Figure 1 is a perspective view of the invention, reduced size, applied to a windshield;

Fig. 2 is a front elevational view of the invention applied to a windshield;

Fig. 3 is a top plan view of the invention applied to a windshield;

Fig. 4 is a view of the invention applied to a windshield, partly in elevation and partly in section, showing the wiper approximately at the end of its stroke;

Fig. 5 is a view similar to Fig. 4, but with the wiper in position to begin its stroke; and Fig. 6 is a vertical section on line 6—6 of Fig. 4.

Like numerals designate like parts in each of the several views.

Referring to the accompanying drawings, there is illustrated a windshield 2 mounted in a frame 1 on which is fastened the bracket 3 to which a suitable windshield wiper arm 5 is mounted by a suitable pivot 4. The wiper arm 5 carries a conventional wiper 6. I provide links 7 for securing the distributing conduit 8 to the wiper arm 5. The distributing conduit 8 is closed at its end but is provided with a series of openings 9 facing the windshield. Conduit 9 has a pivotal connection 10 with the hollow piston rod 11 which has a hollow ball 14 and socket 13 connection with the piston 12, which is slidably mounted in the cylinder 18. The piston 13 has a valve-controlled passage 16 leading to the hollow piston rod 11, a valve 15 being mounted in the outer end of the passage, as shown in Figs. 4, 5, and 6. Chamber 18, which preferably is cylindrical, is positioned in the lower portion of the approximately rectangular chamber 17.

As shown in Figs. 4 and 5, I provide a valve 19 normally held in closed position by spring 20 to close the passage 21 from the upper portion of the casing 17 to the cylinder 18. I also provide a manually controlled valve 22 in the passage to cylinder 18.

As shown in Figs. 4 and 5, the casing 17 is attached to the windshield frame 1 by suitable means, such as the bolts 23, which are inserted through brackets 23'. The casing 17 is provided with a suitable removable cap 24 whereby the casing may be readily filled with a suitable liquid, having a freezing point below the freezing point of water. As shown in Figs. 4 and 5, I provide a slot 25 in the end of casing 17 to allow for the reciprocating movement of the hollow piston rod 11.

In using the apparatus the cap 24 is removed and the casing 17 is partially or completely filled with a suitable liquid, such as glycerine, which has a substantially lower freezing temperature than water. When the wiper is started in operation it may be assumed to be in the position shown in Fig. 5. As the conduit 8 and hollow piston rod 11 are swung outwardly by the wiper arm 5, the piston 12 is drawn toward the other end of the cylinder 18 as shown in Fig. 4 thereby causing the liquid to flow from the upper chamber of the container into the cylinder 18 as shown in Fig. 4, the valve 19 being opened automatically by the inflow of the liquid into cylinder 18. When the wiper arm 5, to which conduit 8 is attached, starts on its return stroke, the valve 19 is immediately closed by its spring 20 and the liquid in cylinder 18 is forced by the return movement of piston 12 past valve 16 and through hollow piston rod 11 into conduit 8 and thence through the opening 9 onto the surface of the windshield to melt any accumulated ice, sleet or snow on the windshield. As the piston is drawn through the cylinder it forms a vacuum which draws the glycerine into the cylinder, as will be readily understood by referring to Figs. 4 and 5 of the drawings. The return of the piston forces the glycerine which has been entrapped within the cylinder through the hollow piston rod 11 and conduit 8 and through its openings 9 and out of the windshield.

When the shut-off valve 22 is closed, the effect is that further admission of the liquid into the cylinder 18 is prevented and air replaces glycerine in the cylinder 18. Valves 19 and 15 are provided respectively with springs 20 and 16 which cause them to close automatically.

The device obtains its power from the windshield wiper as the conduit 8 is fastened by links to the wiper arm 5 and is positioned relative to the wiper arm far enough down to give the piston conduit the correct movement.

In some cases it might be necessary to replace the original wiper arm with a new one as some of them might not stand the strain. If desired, the conventional wiper arm can be replaced with a hollow wiper arm having a series of apertures corresponding with the apertures 9 of the distributor conduit 8, and functioning in the same way for the distribution on the windshield of a liquid having a low freezing point.

What I claim is:—

In a device for melting snow and ice on windshields, the combination of a container for a liquid having a lower freezing point than water, said container having a chamber in its lower portion, a valve-controlled passage between one end of said chamber and the upper portion of the container, a piston slidably mounted in said chamber, the piston having a passage therethrough, a spring controlled valve at the mouth of said passage, a hollow piston rod with which said passage communicates, a tube pivotally connected to the outer end of the hollow piston rod and having its free end closed, and also having a series of spaced apertures for the discharge of liquid on the windshield, and means for attaching said hollow piston rod to the wiper arm of a conventional windshield wiper.

HOWARD EDWIN FRENCH.